US012480633B2

United States Patent
De Lamberterie et al.

(10) Patent No.: US 12,480,633 B2
(45) Date of Patent: Nov. 25, 2025

(54) OPTICAL MODULE FOR A LIGHT-EMITTING DEVICE OF A MOTOR VEHICLE

(71) Applicant: VALEO VISION, Bobigny (FR)

(72) Inventors: Antoine De Lamberterie, Bobigny (FR); Benoit Delande, Bobigny (FR); Kostadin Beev, Bobigny (FR); Alexandre Franc, Ath (BE)

(73) Assignee: Valeo Vision, Bobigny (FR)

(*) Notice: Subject to any disclaimer, the term of this patent is extended or adjusted under 35 U.S.C. 154(b) by 0 days.

(21) Appl. No.: 18/705,803

(22) PCT Filed: Oct. 28, 2022

(86) PCT No.: PCT/EP2022/080221
§ 371 (c)(1),
(2) Date: Apr. 29, 2024

(87) PCT Pub. No.: WO2023/073182
PCT Pub. Date: May 4, 2023

(65) Prior Publication Data
US 2024/0418338 A1    Dec. 19, 2024

(30) Foreign Application Priority Data
Oct. 29, 2021  (FR) ........................................ 2111526
Jan. 31, 2022  (FR) ........................................ 2200834

(51) Int. Cl.
*F21S 43/14*    (2018.01)
*B60Q 1/26*    (2006.01)
(Continued)

(52) U.S. Cl.
CPC .............. *F21S 43/14* (2018.01); *B60Q 1/263* (2013.01); *B60Q 3/64* (2017.02); *B60Q 3/78* (2017.02);
(Continued)

(58) Field of Classification Search
CPC ............................... F21S 43/237; F21S 43/243
See application file for complete search history.

(56) References Cited

U.S. PATENT DOCUMENTS 9,062,844 B2 *  6/2015  Saito ...................... F21S 41/24
9,162,616 B2    10/2015  Wu
(Continued)

FOREIGN PATENT DOCUMENTS

CN         102734721 A      10/2012
DE      102020102602 A1      8/2021
(Continued)

OTHER PUBLICATIONS

European Patent Office, International Search Report (with English translation) and Written Opinion of corresponding International Application No. PCT/EP2022/080221, dated Dec. 23, 2022.
(Continued)

*Primary Examiner* — Matthew J. Peerce
(74) *Attorney, Agent, or Firm* — Valeo Vision

(57) ABSTRACT

The invention relates to an optical module for a light-emitting device of a motor vehicle including a first light source able to emit light rays. A light guide including a first coupling face able to receive light rays emitted by the first light source and able to scatter light rays propagating through the light guide over all or some of its perimeter. A transparent or translucent exit lens, with the exit lens defining a housing in which most of the light guide lies, so that light rays scattered by the light guide pass through the exit lens. A deviating member placed in the housing facing the light guide and arranged to redirect light rays scattered by the light guide toward this deviating member in the direction of the exit lens. A sealing member arranged to keep the deviating member in the housing and to obturate the housing.

7 Claims, 3 Drawing Sheets

(51) Int. Cl.
  *B60Q 3/64*  (2017.01)
  *B60Q 3/78*  (2017.01)
  *F21S 43/247* (2018.01)
  *F21S 43/27*  (2018.01)
  *F21S 45/50*  (2018.01)

(52) U.S. Cl.
  CPC ............. *F21S 43/247* (2018.01); *F21S 43/27* (2018.01); *F21S 45/50* (2018.01)

(56) References Cited

U.S. PATENT DOCUMENTS

| | | | |
|---|---|---|---|
| 9,182,095 B2 | 11/2015 | Gomez | |
| 9,638,389 B2* | 5/2017 | Fukui | F21S 43/27 |
| 10,677,977 B2* | 6/2020 | Liu | F21S 43/237 |
| 10,838,137 B2* | 11/2020 | McCarter | G02B 6/0055 |

FOREIGN PATENT DOCUMENTS

| | | |
|---|---|---|
| FR | 3087247 A1 | 4/2020 |
| JP | 2011044395 A | 3/2011 |
| JP | 2013100100 A | 5/2013 |
| JP | 2015009662 A | 1/2015 |
| JP | 2021098322 A | 7/2021 |
| WO | 2021033381 A1 | 2/2021 |

OTHER PUBLICATIONS

Japan Patent Office, Office Action (with English translation) of corresponding Japanese Patent Application No. 2024-525505, dated May 20, 2025, 10 pages.

Japan Patent Office, Search Report (with English translation) of corresponding Japanese Patent Application No. 2024-525505, dated Apr. 25, 2025, 37 pages.

* cited by examiner

OPTICAL MODULE FOR A LIGHT-EMITTING DEVICE OF A MOTOR VEHICLE

TECHNICAL FIELD

The invention relates to the technical field of light guides for vehicles. It is particularly applicable, but not limited, to automotive vehicles.

BACKGROUND OF THE INVENTION

In the field of automotive vehicle lighting and/or signaling, luminous devices using a light guide are known. This light guide conventionally comprises a coupling face facing which is arranged a light source, and a body extending from the coupling face in which the light emitted by the light source, coupled to the light guide via the coupling face, propagates by total internal reflection against the walls of this body. Diffusing elements are generally provided along the body to allow the decoupling of the light propagating therein toward the outside of the guide. This light guide thus makes it possible to perform luminous functions, in particular luminous signaling such as a daytime running light, a position light or a direction indicator, while offering ample room for maneuver in terms of esthetics.

Such a light guide has a number of drawbacks, however.

Firstly, in the known luminous devices, the light guides are generally placed behind a protective outer lens, which makes it possible in particular to ensure the sealing of the inside of the luminous device. However, in modern luminous devices, this protective outer lens tends to be eliminated and the light guide is installed directly in the grille of the vehicle. As a result, there is a risk that the light guide will be damaged by the climatic conditions.

Secondly, in the known luminous devices, the light guides installed directly in the grille of the vehicle must be secured to said grille so that the light guide is completely secured vis-à-vis the vibrations of the moving automotive vehicle. During the design of the optical module, parts can partially obscure said light guide, which results in loss of performance of said guide.

The invention therefore falls within this context and seeks to overcome all of the aforementioned drawbacks. The invention thus seeks to propose an optical module comprising a light guide and a support for said guide making it possible to shape it while securing it optimally to the grille and making it possible to obtain optimum performance of said light guide.

SUMMARY OF THE INVENTION

The invention relates to an optical module for a luminous device of an automotive vehicle comprising a first light source capable of emitting light rays; a light guide comprising a first coupling face capable of receiving light rays emitted by the first light source and capable of diffusing light rays propagating in the light guide over all or part of its perimeter; a transparent or translucent exit outer lens, said exit outer lens defining a recess in which extends the majority of the light guide so that light rays diffused by the light guide pass through said exit outer lens; a deflecting member positioned in the recess facing the light guide and arranged to redirect light rays diffused by the light guide toward this deflecting member in the direction of said exit outer lens; and a sealing member arranged to hold the deflecting member in the recess and to shut off said recess.

The first light source can be a semiconductor light source. In another embodiment, said first semiconductor light source forms part of a light-emitting diode. Light-emitting diode is given to mean any type of light-emitting diode, whether these are, in non-limiting examples, LEDs, OLEDs (organic LEDs), AMOLEDs (active-matrix-organic LED), or even FOLEDs (flexible OLEDs). The first light source can be positioned on an electronic support mounted on the first printed circuit board.

The luminous module comprising the light guide can be configured to perform a lighting and/or signaling function or an interior lighting function. In the present application, light guide is given to mean an optical part capable of guiding light by successive total internal reflections of this light on one or more peripheral walls of this part, from the first coupling face toward an exit zone of the light guide, for example formed by a portion, or even all, of the peripheral wall or walls. The light guide can be flexible. The light guide can in particular be a substantially cylindrical element. The cross-section of said tubular element can, by way of non-limiting example, have a circular, square, rectangular, or triangular outline, or in the shape of an assembly of curved and/or straight portions. Said cross-section can further vary in size and/or shape along the longitudinal profile of said light guide. As a variant, the cross-section can be constant along the light guide.

The light guide can comprise a plurality of diffusing members on the entire refracting surface of said light guide. The diffusing members are thus provided or formed on all or part of the perimeter of said refracting surface of the light guide, allowing the diffusion of the light rays circulating in the light guide over 360° in all directions.

The exit outer lens comprises, facing the recess, an entry face for the light rays diffused by the light guide, and comprises an exit face for the light rays entering the exit outer lens through this entry face.

The deflecting member can be arranged to redirect the light rays diffused by the light guide by reflection or by diffusion. The deflecting member can in particular comprise a white material allowing the reflection or diffusion of said light rays.

The light guide comprises a first diffusing portion facing the entry face of the exit outer lens and a second diffusing portion facing a reflective and/or diffusing face of the deflecting member, said reflective and/or diffusing face being arranged to redirect the light rays diffused by the light guide via the second portion toward the entry face of the exit outer lens. Said reflective and/or diffusing face is arranged to redirect the light rays diffused by the light guide via the second portion in the light guide, toward the first diffusing portion.

Advantageously, the deflecting member and the sealing member form a single part.

In this embodiment, the single part can be made from reflective and/or diffusing silicone, for example a white silicone. This single part can be molded directly in the recess after the light guide has been positioned therein.

Advantageously, the deflecting member and the sealing member form two separate parts.

In this embodiment, the reflecting member is made from a diffusing and/or reflective thermoplastic, for example white, for example polyurethane, in particular filled with titanium dioxide (TiO2), and the sealing member is made from a thermoplastic resin or silicone.

The sealing member can be in the recess.

The sealing member can be molded directly in the recess after the light guide and the deflecting member have been positioned therein and so that it is fully or partially in contact with the deflecting member. The sealing member can be molded and then inserted into the recess.

Advantageously, the recess of the exit outer lens comprises a set of lateral walls joined together to form a U and an opening, the deflecting member being arranged in said opening of said recess of the exit outer lens.

The exit outer lens can comprise a U-shaped profile. The recess of the exit outer lens can be defined by a U-shaped wall and an opening. The light guide can be inserted into the recess through said opening. The exit outer lens can make it possible to shape the flexible light guide. By inserting the flexible light guide into the recess of the exit outer lens, said light guide is thus stiffened and in its operating shape.

Advantageously, the deflecting member comprises an L-shaped profile.

The deflecting member can comprise substantially similar dimensions to the recess so that it can be inserted easily into said recess. The deflecting member can comprise two arms forming an angle between them so that it comprises an L-shaped profile. The two arms can make it possible to surround the light guide. The two arms can make it possible to hold the light guide in place in the recess.

Advantageously, the exit outer lens has an exit face for the light rays diffused by the light guide, said exit face being arranged to deflect said light rays diffused by the light guide in a predetermined general direction.

The exit face of the exit outer lens comprises a radius of curvature suitable for deflecting the light rays diffused by the light guide.

Advantageously, the optical module comprises at least one occulting mask arranged downstream of the exit outer lens, in line with the exit face.

Using an exit outer lens comprising an exit face comprising a radius of curvature can make it possible to deflect the light rays so that they can be diffused, even when the occulting mask is arranged downstream of said exit outer lens. The light rays initially diffused opposite the occulting mask can thus be deflected in order to provide light in a non-occulted zone.

Advantageously, the exit outer lens comprises a plurality of members for fastening to a chassis.

In one embodiment, each fastening member can be a lug for fastening to the chassis of the automotive vehicle.

Advantageously, the plurality of fastening members can extend to the rear of the recess. Said fastening members can extend in the continuation of one of the ends of the U-shaped wall.

Advantageously, the optical module comprises a second light source capable of emitting light rays, and the light guide comprises a second coupling face, opposite the first coupling face and capable of receiving light rays emitted by the second light source.

The light guide can thus be connected to the first light source by its first coupling face and to the second light source by its second coupling face. The light rays diffused by the light guide can come from said first light source and from said second light source.

Advantageously, the light guide comprises a core surrounded by a sheath, the core and the sheath being arranged so that light rays entering the light guide through the first coupling face propagate in the core by total internal reflection on a refracting surface formed by the core and the sheath, and a plurality of diffusing members arranged to diffuse the light rays propagating in the core toward the outside of the sheath.

The sheath can have a role of protecting the core and/or an optical role by making it possible to guide part of the light and form the interface with the core so as to facilitate the extraction of part of the light rays in the region of each of the diffusing members. Preferably, the refractive index of the sheath can be lower than the refractive index of the core in order to make it possible to ensure that the light is guided by total internal reflection.

The light guide can be made up of a single core encapsulated in a single sheath, or a bundle of a plurality of cores encapsulated in a single sheath. The light guide can in particular comprise a core forming and optical fiber. The core/sheath interface can form a refracting surface against which the light rays propagating in the core are reflected by total internal reflection. The core of the light guide can be extruded from a material such as glass or a plastic material such as polymethyl methacrylate (PMMA) or polycarbonate (PC).

The diffusing members can comprise irregularities on an outer surface of the core or on an inner surface of the sheath, these irregularities being obtained for example by abrasion, by sand or by laser impact. In another embodiment, the diffusing members can be arranged or formed in the core and can comprise a diffusing particle mounted in the core in the region of the refracting surface.

Another aspect of the invention relates to a luminous device of an automotive vehicle comprising at least one optical module.

In another embodiment, the luminous device can comprise a plurality of optical modules.

BRIEF DESCRIPTION OF THE DRAWINGS

Other advantages and features of the present invention will now be described using examples that are purely illustrative and by no means limit the scope of the invention, and on the basis of the appended drawings, in which the various figures show.

In the following description, elements that are identical in terms of structure or function and that appear in different figures retain the same reference signs, unless otherwise specified.

DETAILED DESCRIPTION OF THE INVENTION

Figure 1:
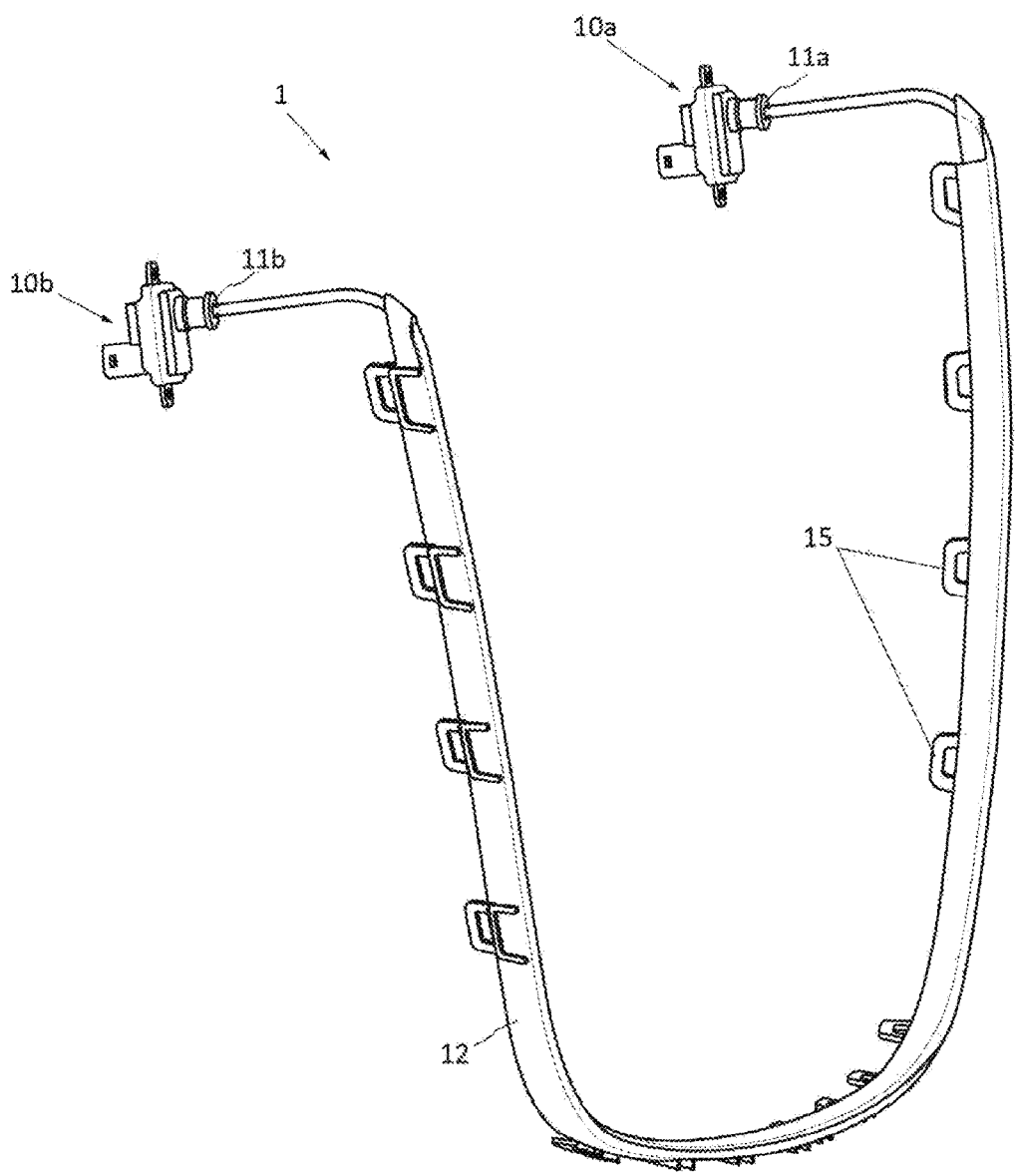
FIG. 1 schematically shows a perspective view of a luminous module.
Figure 2:
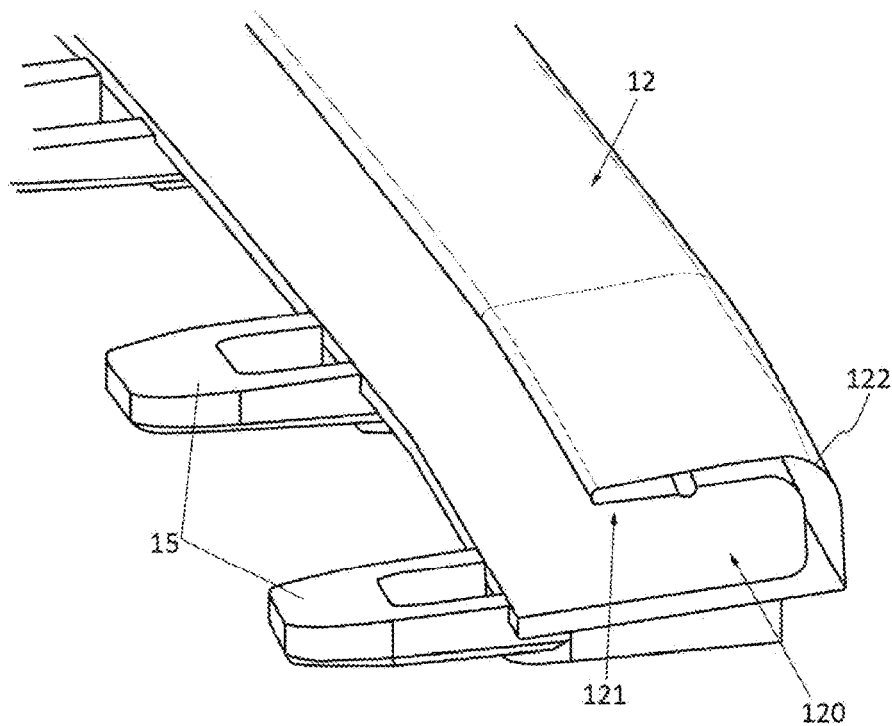
FIG. 2 schematically shows a cross-sectional perspective view of an exit outer lens according to one embodiment.
Figure 3:
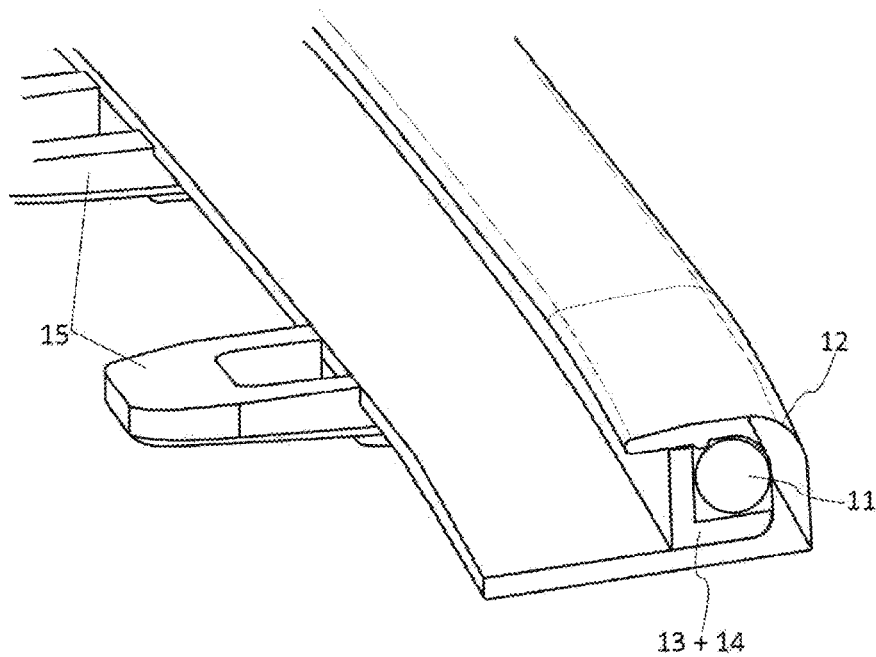
FIG. 3 schematically shows a cross-sectional perspective view of a portion of a luminous module according to one embodiment.
Figure 4:
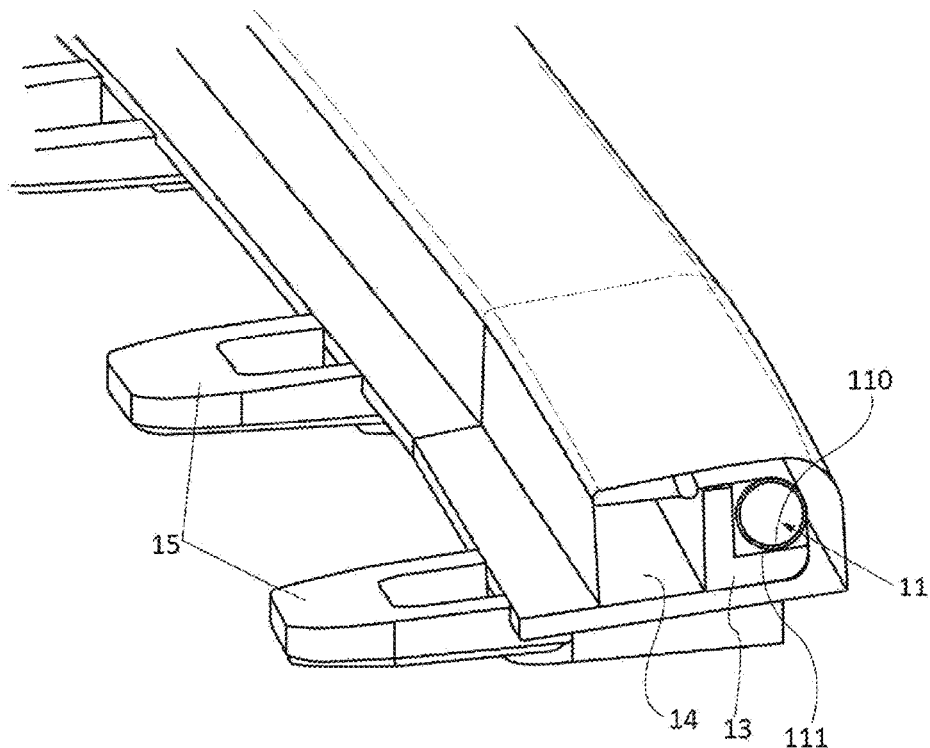
FIG. 4 schematically shows a cross-sectional perspective view of a portion of a luminous module according to another embodiment.
Figure 5:
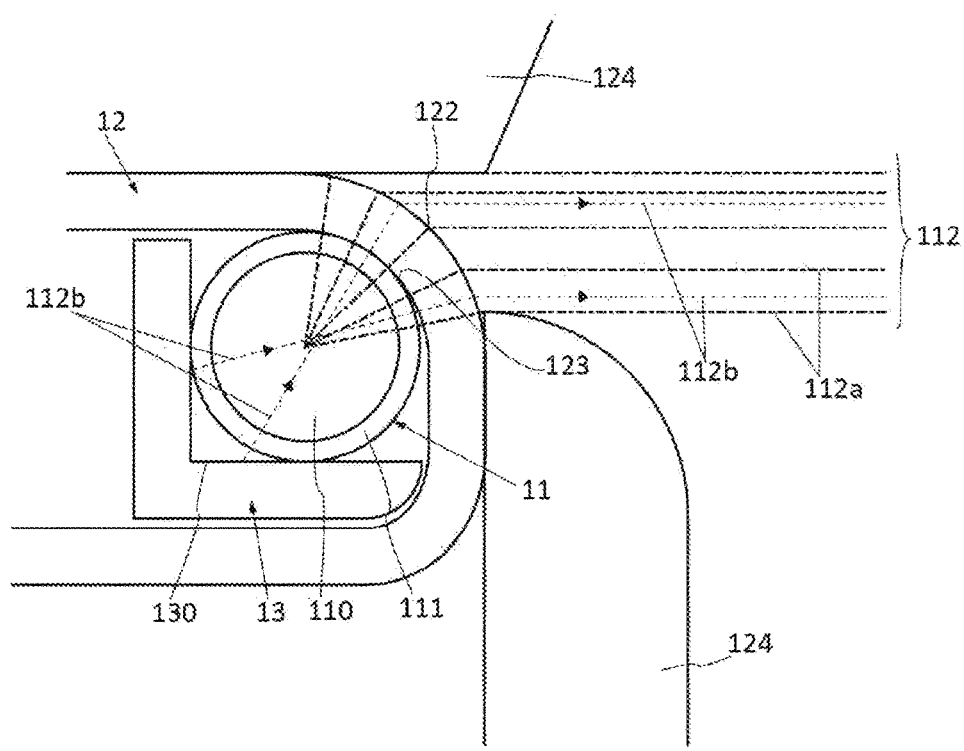
FIG. 5 schematically shows a cross-sectional view of a portion of a luminous module according to one embodiment.

FIG. 1 shows a cross-sectional view of a luminous module 1 of a luminous device for an automotive vehicle according to a particular embodiment of the invention. This luminous module 1 is described in connection with FIG. 2, FIG. 3, FIG. 4 and FIG. 5. FIG. 3 and FIG. 4 show two particular embodiments of the invention. FIG. 5 describes the propagation of the light rays diffused in one embodiment.

The optical module 1 comprises a first light source 10*a* and a second light source 10*b*, each being capable of emitting light rays 112. The optical module 1 also comprises a light guide 11 comprising a first coupling face 11a suitable for interacting with the first light source 10a and a second coupling face 11b suitable for interacting with the second light source 10b. The first coupling face 11a and the second coupling face 11b are opposite each other, on either side of said light guide 11.

The light guide 11 is suitable for receiving, through said first coupling face 11a and second coupling face 11b, the light rays 112 emitted by said first light source 10a and second light source 10b.

The light guide 11 is capable of diffusing the light rays 112 emitted by said first and second light sources 10a, 10b. The light guide 11 is an optical part capable of guiding light by successive total internal reflections of this light on one or more peripheral walls of said part from one of the first and second coupling faces 11a, 11b toward an exit zone of said light guide 11. The light guide 11 is a substantially cylindrical element with a tubular cross-section.

The light guide 11 comprises a core 110 surrounded by a sheath 111, the core 110 and the sheath 111 being arranged so that light rays 112 entering the light guide 11 through one of the first and second coupling faces 11a, 11b propagate in the core 110 by total internal refection on a refracting surface formed by the core 110 and the sheath 111. The light guide 11 comprises a plurality of diffusing members (not shown) arranged on the entire refracting surface of said light guide in order to diffuse the light rays 112 propagating in the core 110 toward the outside of the sheath 111. The diffusing members are provided or formed on all or part of the perimeter of said refracting surface of the light guide 11, allowing the diffusion of the light rays 112 circulating in said light guide 11 over 360° in all directions.

The optical module 1 comprises a transparent or translucent exit outer lens 12. The exit outer lens 12, described in FIG. 2, defines a recess 120. The recess 120 comprises a set of lateral walls joined together to form a U-shaped profile and to form an opening 121.

The exit outer lens 12 comprises a plurality of members 15 for fastening to a chassis of the automotive vehicle. Each of the fastening members 15 extends to the rear of the recess 120, in the continuation of one of the ends of the U-shaped wall.

The majority of the light guide 11 extends in the recess 120 so that the light rays diffused by said light guide 11 pass through the exit outer lens 12. As the light guide 11 is flexible, it can thus be shaped by the exit outer lens 12, the light guide 11 then being stiffened and in its operating shape.

The exit outer lens 12 comprises, facing the recess 120, an entry face 123 for the light rays 112 diffused by the light guide 11, and comprises an exit face 122 for the light rays 112 entering the exit outer lens 12 through this entry face 123.

The optical module 1 comprises a deflecting member 13 positioned in the recess 120, facing the light guide 11. The deflecting member 13 is arranged to redirect the light rays 112 diffused by the light guide 11 by reflection or by diffusion toward the deflecting member 13 in the direction of the exit outer lens 12. The deflecting member 13 comprises a white material allowing the reflection or diffusion of said light rays 112.

The deflecting member 13 comprises two arms forming an angle between them so that it comprises an L-shaped profile. The two arms are suitable for surrounding the light guide 11 and holding it in the recess 120.

The optical module 1 comprises a sealing member 14 arranged to interact with the deflecting member 13. The sealing member 14 is arranged to hold the deflecting member 13 in the recess 120 and to shut off said recess 120.

FIG. 3 shows a first embodiment of the optical module 1 and FIG. 4 shows a second embodiment of the optical module 1.

The embodiment shown in FIG. 3 comprises a deflecting member 13 and a sealing member 14 forming a single part, the two members being made from the same material. In this case, the light guide 11 is inserted into the recess 120 of the exit outer lens 12 and the single part 13, 14 is formed by molding directly in the recess 120. The molding of the single part holds the light guide 11 in the recess 120.

The embodiment shown in FIG. 4 comprises a deflecting member 13 and a sealing member 14 forming two separate parts formed from two separate materials. In this case, the light guide 11 is inserted into the recess 120 of the exit outer lens 12 and then the deflecting member 13 is inserted so as to press said light guide 11 against the entry face 123 of the exit outer lens 12. The sealing member 14 is molded directly in the recess 120 so as to hold the deflecting member 13 in the recess 120 and also to seal said recess 120.

FIG. 5 shows the path of the light rays 112 diffused by the light guide 11 when two occulting masks 124 are arranged downstream of the exit outer lens 122, in line with said exit face 122.

The light rays 124 emitted by the first and second light sources 10a, 10b are directed toward the light guide 11 by the first and second coupling faces 11a, 11b. The light guide 11 comprises a first diffusing portion facing the entry face 123 of the exit outer lens 12 and a second diffusing portion facing a reflective and/or diffusing face 130 of the deflecting member 13. The light rays 124 diffused by the light guide 11 in the region of said first diffusing portion are diffused directly in the direction of the entry face 122 of the exit outer lens 12 and form directly diffused rays 112a. The light rays 124 diffused by the light guide 11 in the region of said second diffusing portion are diffused in the direction of the reflective and/or diffusing face 130 of the deflecting member 13. Said reflective and/or diffusing face 130 is arranged to redirect the light rays 112 diffused in its direction by the second diffusing portion of the light guide 11, passing back through said second diffusing portion, toward the entry face 123 of the exit outer lens 12. The exit face 122 of the exit outer lens 12 comprises a curvature suitable for deflecting all of the light rays 112, that is, the light rays 112a diffused in the direction of the first diffusing portion and the light rays 112a diffused in the direction of the second diffusing portion. All of the light rays 112 diffused by the light guide 11 are thus diffused, despite the presence of occulting masks facing the exit face 122 of the exit outer lens 12.

The description above clearly explains how the invention achieves the stated objectives, namely obtaining an optical module comprising a light guide and a support for said guide making it possible to shape it while securing it optimally to the grille and making it possible to obtain optimum performance of said light guide, by proposing an optical module for a luminous device of an automotive vehicle comprising a first light source capable of emitting light rays; a light guide comprising a first coupling face capable of receiving light rays emitted by the first light source and capable of diffusing light rays propagating in the light guide over all or part of its perimeter; a transparent or translucent exit outer lens, said exit outer lens defining a recess in which extends the majority of the light guide so that light rays diffused by the light guide pass through said exit outer lens; a deflecting member positioned in the recess facing the light guide and arranged to redirect the light rays diffused by the light guide toward this deflecting member in the direction of said exit outer lens; and a sealing member arranged to hold the deflecting member in the recess and to shut off said recess.

In any event, the invention is not limited to the embodiments specifically described in this document, and extends in particular to all equivalent means and to any technically workable combination of these means.

What is claimed is:

1. An optical module for a luminous device of an automotive vehicle, comprising:
    a first light source and a second light source capable of emitting light rays;
    a light guide including a first coupling face capable of receiving light rays emitted by the first light source;
    a second coupling face adapted to receive light rays emitted by the second light source,
    where the second coupling face and the first coupling face are configured to diffuse light rays propagating in the light guide over a portion of a perimeter form of the light guide;
    an exit outer lens that is transparent or translucent, the exit outer lens defining a recess that extends a majority of the light guide such that light rays diffused by the light guide pass through the exit outer lens;
    a deflecting member and a sealing member forming a single part where the deflecting and sealing members are made from a same material, wherein the deflecting member includes an L-shaped profile;
    the light guide inserted into a recess of the exit outer lens wherein the single part is formed directly in the recess, the single part holding the light guide within the recess and the single part arranged to shut-off the recess;
    the deflecting member facing the light guide and arranged to redirect light rays diffused by the light guide toward this the deflecting member in a direction of the exit outer lens; and
    wherein the recess of the exit outer lens includes a set of lateral walls joined together to form a U-shaped profile and an opening, the deflecting member being arranged in the opening of the recess of the exit outer lens.

2. The optical module of claim 1, wherein the exit outer lens has an exit face for the light rays diffused by the light guide, the exit face being arranged to deflect the light rays diffused by the light guide in a predetermined general direction.

3. The optical module of claim 2, further comprising at least one occulting mask arranged downstream of the exit outer lens, arranged inline with the exit face.

4. The optical module of claim 1, wherein the exit outer lens includes a plurality of members configured to fasten to a chassis.

5. The optical module of claim 1, where the second light source is capable of emitting light rays at an exit face, and
    the first coupling face is capable of receiving light rays at an entry face.

6. The optical module of claim 1, wherein the light guide includes a core surrounded by a sheath,
    the core and the sheath being arranged se-such that light rays entering the light guide through the first coupling face propagate in the core by total internal reflection on a refracting surface formed by the core and the sheath, and
    a plurality of diffusing members arranged to diffuse the light rays propagating in the core toward the outside of the sheath.

7. A luminous device for an automotive vehicle, comprising:
    an optical module including
        a first light source capable of emitting light rays;
        a second light source capable of emitting light rays;
        a light guide including a first coupling face and a second coupling face configured to receive light rays;
        the first coupling face configured to receive light rays emitted by the first light source;
        the first coupling face adapted to diffuse light rays propagating in the light guide over at least a portion of a perimeter form of the light guide;
        an exit outer lens that is transparent or translucent where the exit outer lens defines a recess in which extends a majority length of the light guide such that light rays diffused by the light guide pass through the exit outer lens;
        a deflecting member and a sealing member forming a single part where the deflecting and sealing members are made from a same material, wherein the deflecting member includes an L-shaped profile;
        the light guide inserted into a recess of the exit outer lens wherein the single part is formed directly in the recess, the single part holding the light guide within the recess and the single part arranged to shut-off the recess;
        the deflecting member facing the light guide and
        arranged to redirect light rays diffused by the light guide toward this the deflecting member in a direction of the exit outer lens; and
        wherein the recess of the exit outer lens includes a set of lateral walls joined together to form a U-shaped profile and an opening, the deflecting member being arranged in the opening of the recess of the exit outer lens.

* * * * *